(12) United States Patent
Kim et al.

(10) Patent No.: US 12,175,259 B2
(45) Date of Patent: Dec. 24, 2024

(54) PROCESSOR FOR INITIALIZING MODEL FILE OF APPLICATION AND ELECTRONIC DEVICE INCLUDING THE SAME

(71) Applicant: SAMSUNG ELECTRONICS CO., LTD., Suwon-si (KR)

(72) Inventors: Chunggeol Kim, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 17/809,485

(22) Filed: Jun. 28, 2022

(65) Prior Publication Data

US 2022/0326964 A1    Oct. 13, 2022

Related U.S. Application Data

(63) Continuation of application No. PCT/KR2022/000637, filed on Jan. 13, 2022.

(30) Foreign Application Priority Data

Feb. 18, 2021    (KR) .......................... 10-2021-0021674

(51) Int. Cl.
*G06F 9/445*    (2018.01)
*G06F 11/34*    (2006.01)
*G06N 3/02*    (2006.01)

(52) U.S. Cl.
CPC ...... *G06F 9/44505* (2013.01); *G06F 9/44521* (2013.01); *G06F 11/3419* (2013.01); *G06N 3/02* (2013.01)

(58) Field of Classification Search
CPC ............. G06F 9/44505; G06F 9/44521; G06F 11/3419; G06F 3/02
See application file for complete search history.

(56) References Cited

U.S. PATENT DOCUMENTS

| | | | | |
|---|---|---|---|---|
| 2008/0005736 | A1* | 1/2008 | Apacible | G06F 12/0868 718/100 |
| 2013/0173513 | A1* | 7/2013 | Chu | G06F 9/451 706/14 |
| 2019/0080239 | A1* | 3/2019 | Yang | G06N 3/044 |
| 2019/0147337 | A1* | 5/2019 | Yang | G06N 3/08 706/25 |
| 2019/0266015 | A1* | 8/2019 | Chandra | G06F 9/505 |
| 2019/0361415 | A1* | 11/2019 | Sakai | G05B 19/042 |
| 2020/0218543 | A1* | 7/2020 | Jung | G06F 9/445 |

(Continued)

FOREIGN PATENT DOCUMENTS

| | | |
|---|---|---|
| KR | 10-2013-0074952 A | 7/2013 |
| KR | 10-2014-0119006 A | 10/2014 |

(Continued)

*Primary Examiner* — Hyun Soo Kim

(57) ABSTRACT

An electronic device includes a memory configured to store one or more applications, and at least one processor configured to control the electronic device. The processor may identify a target model file based on a neural network and associated with a target application among the one or more applications, determine a target initialization time of the target model file among a plurality of preset initialization times, and initialize the target model file at the target initialization time. In addition, various example embodiments may be implemented.

16 Claims, 13 Drawing Sheets

(56) References Cited

U.S. PATENT DOCUMENTS

2020/0409757 A1* 12/2020 McBride ............... G06F 9/5038
2022/0269536 A1*  8/2022 Cui ....................... G06N 3/045

FOREIGN PATENT DOCUMENTS

| KR | 10-2019-0014580 A | 2/2019 |
| KR | 10-2019-0030034 A | 3/2019 |
| KR | 10-2019-0036317 A | 4/2019 |
| KR | 10-2020-0037602 A | 4/2020 |
| KR | 10-2150774 B1 | 8/2020 |
| WO | 2021000890 A1 | 1/2021 |

* cited by examiner

PROCESSOR FOR INITIALIZING MODEL FILE OF APPLICATION AND ELECTRONIC DEVICE INCLUDING THE SAME

CROSS-REFERENCE TO RELATED APPLICATIONS

This application is a bypass continuation of International Application No. PCT/KR2022/000637, filed on Jan. 13, 2022, which claims priority to Korean Patent Application No. 10-2021-0021674, filed on Feb. 18, 2021, in the Korean Intellectual Property Office, the disclosures of which are incorporated by reference herein in their entireties.

BACKGROUND

1. Field

The disclosure relates to an electronic device for initializing a model file of an application installed in the electronic device.

2. Description of Related Art

Applications that enhance user convenience using artificial intelligence (AI) functions in a use environment of a mobile terminal are being developed. In mobile terminals, hardware accelerators to provide various AI functions of applications are being actively used.

SUMMARY

One or more example embodiments of the disclosure provide an electronic device that may initialize a model file of an application installed in the electronic device.

However, the technical aspects are not limited to the aforementioned aspects, and other technical aspects may be present.

According to various example embodiments, an electronic device includes a memory configured to store one or more applications, and at least one processor configured to control the electronic device, wherein the processor is configured to identify a target model file based on a neural network and associated with a target application among the one or more applications, determine a target initialization time of the target model file among a plurality of preset initialization times, and initialize the target model file at the target initialization time.

According to various example embodiments, a method of initializing a model file of an application is performed by an electronic device and includes identifying a target model file based on a neural network and associated with a target application among one or more applications installed in the electronic device, determining a target initialization time of the target model file among a plurality of preset initialization times, and initializing the target model file at the target initialization time.

According to various example embodiments, an electronic device includes a memory configured to store one or more applications, and at least one processor configured to control the electronic device, wherein the processor is configured to generate a model file list including one or more model files of the processor, determine an initialization time of each of the one or more model files based on usage patterns of the one or more applications, and initialize a model file corresponding to a first initialization time at the first initialization time.

According to various example embodiments, an electronic device for initializing a model file of an application installed in the electronic device may be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, obj ect code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
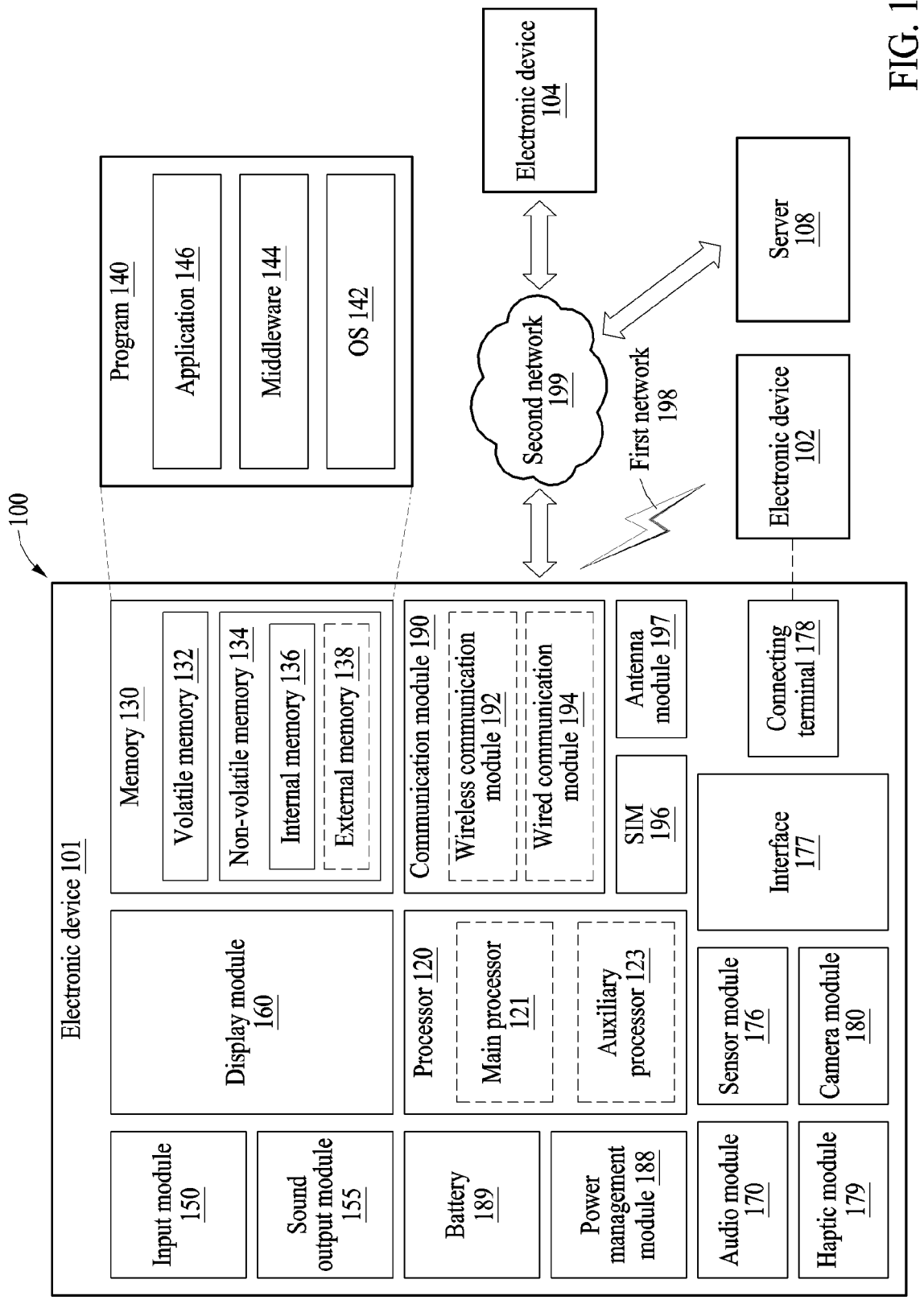
FIG. 1 illustrates a block diagram illustrating an electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device in a network environment according to various example embodiments.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output device 155 may output a sound signal to the outside of the electronic device 101. The sound output device 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
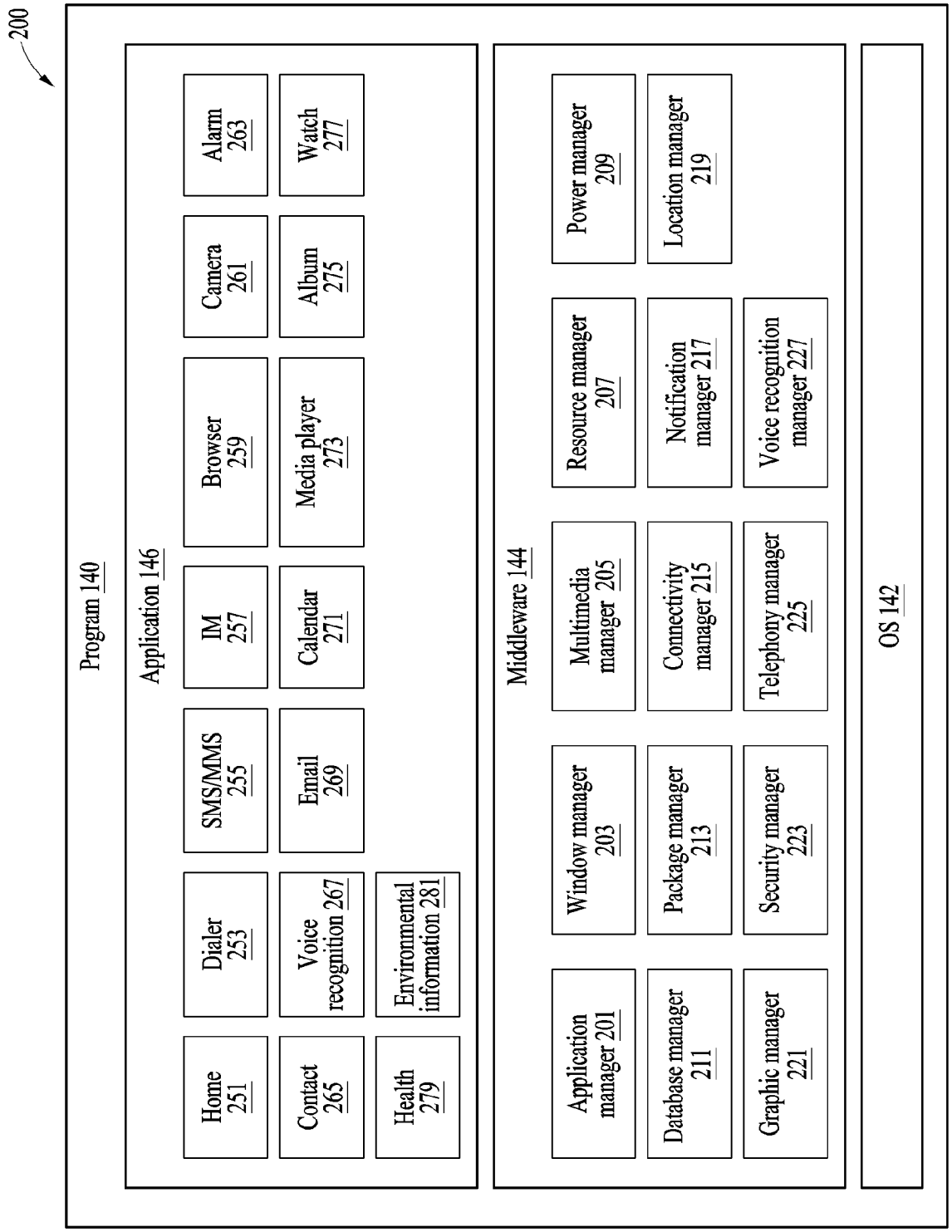
FIG. 2 illustrates a block diagram illustrating a program according to various example embodiments.

FIG. 2 is a block diagram illustrating a program according to various example embodiments.

According to an example embodiment, the program 140 described above with reference to FIG. 1 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146.

The window manager 203, for example, may manage one or more graphical user interface (GUI) resources that are used on a screen.

The multimedia manager 205, for example, may identify one or more formats to be used to play media files, and may encode or decode a corresponding one of the media files using a codec appropriate for a corresponding format selected from the one or more formats.

The resource manager 207, for example, may manage the source code of the application 146 or a memory space of the memory 130.

The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146.

The package manager 213, for example, may manage installation or update of an application that is distributed in the form of a package file.

The connectivity manager 215, for example, may manage a wireless connection or a direct connection between the electronic device 101 and the external electronic device.

The notification manager 217, for example, may provide a function to notify a user of an occurrence of a specified event (e.g., an incoming call, a message, or an alert).

The location manager 219, for example, may manage location information on the electronic device 101.

The graphic manager 221, for example, may manage one or more graphic effects to be offered to a user or a user interface related to the one or more graphic effects.

The security manager 223, for example, may provide system security or user authentication.

The telephony manager 225, for example, may manage a voice call function or a video call function provided by the electronic device 101.

The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data.

According to an example embodiment, the middleware 144 may dynamically delete some existing components or add new components. According to an example embodiment, at least part of the middleware 144 may be included as a part of the OS 142 or implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101 or a portion of components thereof (e.g., a display module or a camera module of the external electronic device). The device management application may additionally or alternatively support installation, delete, or update of an application running on the external electronic device.

Figure 3:
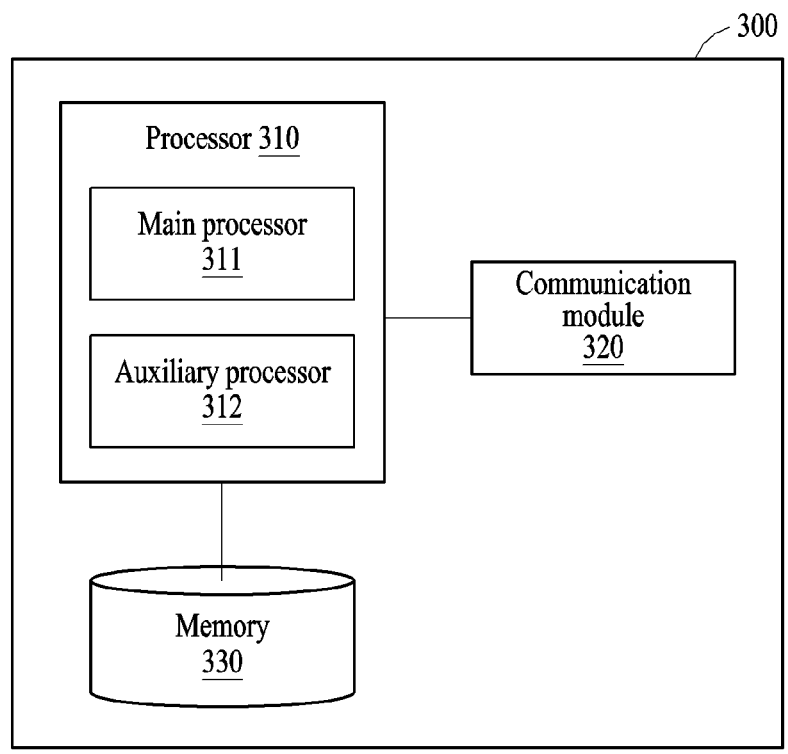
FIG. 3 illustrates a block diagram of an electronic device according to various example embodiments.

FIG. 3 is a block diagram of an electronic device according to various example embodiments.

Referring to FIG. 3, an electronic device 300 (e.g., the electronic device 101 of FIG. 1) may include a processor 310 (e.g., the processor 120 of FIG. 1), a communication module 320 (e.g., the communication module 190 of FIG. 1), and a memory 330 (e.g., the memory 130 of FIG. 1).

According to an example embodiment, the processor 310 may include a main processor 311 (e.g., a CPU, or an AP) or an auxiliary processor 312 (e.g., a GPU, an NPU, an ISP, a digital signal processor (DSP), a sensor hub processor, or a CP) that is operable independently of, or in conjunction with the main processor 311. For example, when the processor 310 includes the main processor 311 and the auxiliary processor 312, the auxiliary processor 312 may be adapted to consume less power than the main processor 311 or to be specific to a specified function. The auxiliary processor 312 may be implemented separately from the main processor 311 or as a part of the main processor 311.

The communication module 320 (e.g., the communication module 190 of FIG. 1) may support establishing a direct (e.g., wired) communication channel or a wireless communication channel between the electronic device 300 and an external electronic device (e.g., the electronic device 102, the electronic device 104, or the server 108 of FIG. 1) and performing communication via the established communication channel. The communication module 320 may include one or more communication processors that are operable independently of the processor 310 and that support a direct communication or a wireless communication.

The memory 330 (e.g., the memory 130 of FIG. 1) may store various data used by at least one component (e.g., the processor 310) of the electronic device 300. The various data may include, for example, software (e.g., the program 140 of FIG. 1) and input data or output data for a command related thereto.

A program (e.g., the program 140 of FIG. 1) may be stored as software in the memory 330, and may include, for example, an OS (e.g., the OS 142 of FIG. 1), middleware (e.g., the middleware 144 of FIG. 1) or an application (e.g., the application 146 of FIG. 1).

According to certain embodiments, one or more applications may be stored or installed in the memory 330 by a user of the electronic device 300. An application installed in the electronic device 300 may include, for example, a game application and a camera application, but is not limited thereto, and may include applications for various purposes.

According to certain embodiments, an application may provide convenience to a user by supporting the user with various AI functions suitable for the purpose of using the application. For example, an AI function may be a model trained for special purposes based on a neural network. A properly trained AI function may generate accurate result data by performing appropriate inference on input data.

A scheme of providing an AI function of an application may include a scheme by which an electronic device (e.g., the electronic device 300) performs inference on input data, and a scheme by which a server (e.g., the server 108 of FIG. 1) performs inference on input data.

In the scheme by which the electronic device performs inference, hardware (e.g., the processor 310) of the electronic device may be used to execute a model for the AI function. To execute the model for the AI function, an initialization process of the model may be required in advance. For example, the initialization process of the model may indicate that the electronic device recognizes a structure of the model. Recognizing the structure of the model by the electronic device may be identifying a library or a program of a basic code of the model. When the initialization process of the model is performed, the electronic device may determine which resources (e.g., the main processor 311 and the auxiliary processor 312 of the processor 310) of the electronic device are to be used for initialization of an optimized model. For example, the initialization of the optimized model may indicate that a specific resource of the electronic device capable of most quickly executing specific code of the model is properly used. The determined resources may change according to a stage of the initialization of the model.

Since resources of the electronic device are used for the initialization of the model, the initialization of the model may have an influence on an execution speed of the application. For example, if the main processor 311 is used for the initialization of the model, the execution speed of the application may decrease.

In the scheme by which the server performs inference, a connection between the electronic device and the server may need to be established in advance to use the model for the AI function, and the main processor 311 may be used to establish the connection, thereby reducing the execution speed of the application. Hereinafter, "initialization of a model" or "initialization of a model file" in the scheme by which the server performs inference may indicate establishing the connection between the electronic device and the server.

According to certain embodiments, a plurality of applications may be installed in the electronic device 300, and an application may provide one or more AI functions. To provide a user with a comfortable use environment of the electronic device 300, a function of initializing models of the one or more AI functions may need to be managed. For example, the above initialization function may be managed by distributing initialization times of the models.

According to an example embodiment, the electronic device 300 may include the memory 330 configured to store one or more applications, and at least one processor 310 configured to control the electronic device 300. The processor 310 may identify a target model file that is based on a neural network and that is associated with a target application among the one or more applications, determine a target initialization time of the target model file among a plurality of preset initialization times, and initialize the target model file at the target initialization time. The term "model file" may be used to specify a model of an AI function associated with an application, and may be used interchangeably with the term "model".

Hereinafter, a method of initializing a model file for an AI function of an application will be described in detail with reference to FIGS. 4 to 12.

Figure 4:
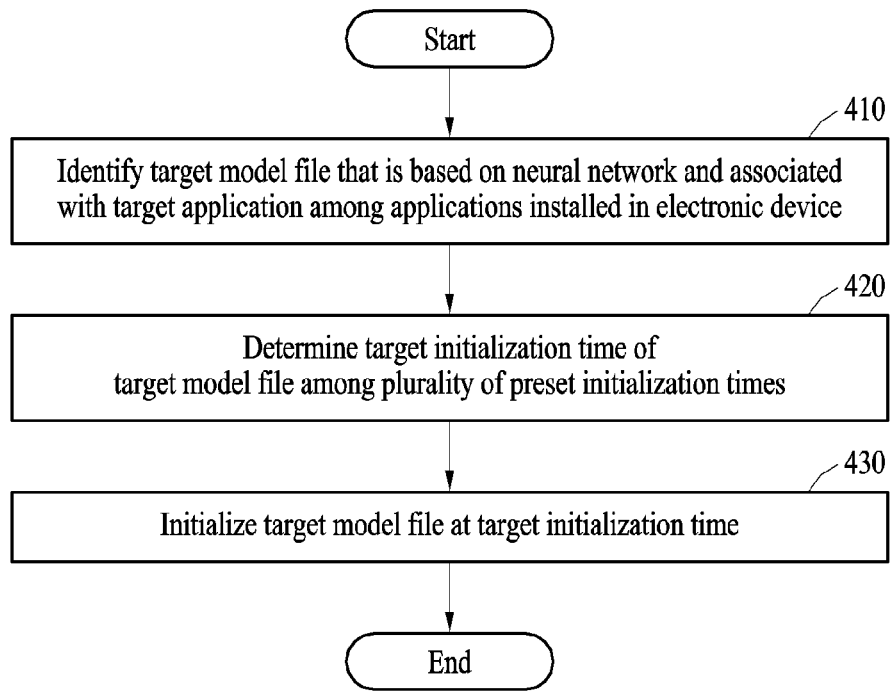
FIG. 4 illustrates a flowchart illustrating a method of initializing a model file of an application according to various example embodiments.

FIG. 4 is a flowchart illustrating a method of initializing a model file of an application according to various example embodiments.

Operations 410 to 430 may be performed by an electronic device (e.g., the electronic device 101 of FIG. 1 or the electronic device 300 of FIG. 3).

In operation 410, a processor (e.g., the processor 120 of FIG. 1 or the processor 310 of FIG. 3) of the electronic device may identify a target model file based on a neural network and associated with a target application among one or more applications installed in the electronic device. The model file may be a file for a model for an AI function of an application.

According to certain embodiments, when one or more applications are installed in the electronic device and when one or more model files are identified, a model file list may be generated and managed. The model file list will be described in detail below with reference to FIGS. 5 and 6.

In operation 420, the processor may determine a target initialization time of the target model file among a plurality of preset initialization times. Each of the plurality of initialization times may correspond to, for example, a booting time, an idle time, an application initialization time, and a time after application initialization (or execution) of the electronic device.

According to certain embodiments, when the target model file is identified, the processor may identify a library or a program of a basic code of the model of the target model file by parsing the target model file. For example, the processor may determine which hardware component (e.g., a CPU, a GPU, an NPU, an ISP, or a DSP) is to be used to execute the identified basic code. Different hardware resources may be determined according to a progress stage of a code. For example, different hardware resources may be determined for each library.

According to certain embodiments, when a plurality of model files are identified, the processor may determine an initialization time of a first model file as a first time (e.g., a booting time), and may determine an initialization time of a second model file as a second time (e.g., an idle time), so that initialization times of the plurality of model files may be distributed.

According to certain embodiments, the processor may determine the target initialization time based on whether initialization of the target application is required for initialization of the target model file. A method of determining an initialization time of a target model file based on whether initialization of a target application is required will be described in detail below with reference to FIG. 7.

According to certain embodiments, the processor may determine the target initialization time based on at least one of a first amount of computational operation for initialization of the target application and a second amount of computational operation for initialization of the target model file. A method of determining an initialization time of a target model file based on the first amount of computational operation and the second amount of computational operation will be described in detail below with reference to FIG. 7.

According to certain embodiments, the processor may determine the initialization time of the target model file based on usage patterns of applications. A method of determining an initialization time of a target model file based on usage patterns of applications will be described in detail below with reference to FIG. 9.

In operation 430, when an operation time of the electronic device is the target initialization time, the processor may initialize the target model file at the target initialization time.

According to certain embodiments, in order to initialize the target mode file, the processor may initialize a runtime engine assigned to the target model file, may initialize a compiler assigned to the target model file, and may initialize a hardware component module assigned to the target model file.

According to certain embodiments, when an inference engine of the target model file is operated by a server (e.g., the server 108 of FIG. 1), a network connection between the electronic device and the server may be established by initializing the target model file.

According to certain embodiments, when the target model file is initialized, output data corresponding to input data may be generated by a neural network of the inference engine of the target model file.

According to an example embodiment, a method of initializing a model file of an application performed by the electronic device 300 may include operation 410 of identifying a target model file based on a neural network and associated with a target application among one or more applications installed in the electronic device 300, operation 420 of determining a target initialization time of the target model file among a plurality of preset initialization times, and operation 430 of initializing the target model file at the target initialization time.

Figure 5:
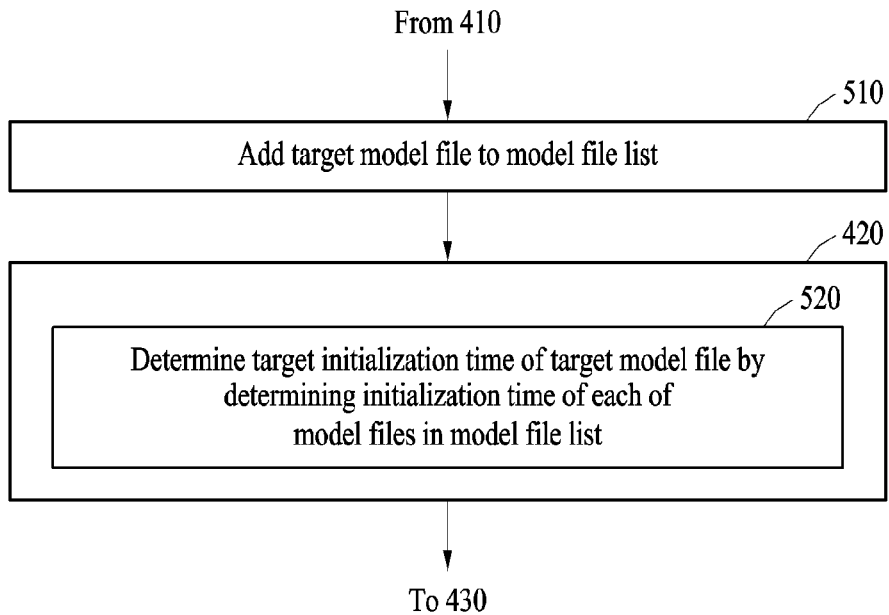
FIG. 5 illustrates a flowchart of a method of determining a target initialization time of a target model file added to a model file list according to various example embodiments.

FIG. 5 is a flowchart of a method of determining a target initialization time of a target model file added to a model file list according to various example embodiments.

According to an example embodiment, operation 510 may be performed before operation 420 of FIG. 4 is performed.

In operation 510, a processor (e.g., the processor 120 of FIG. 1 or the processor 310 of FIG. 3) of an electronic device (e.g., the electronic device 101 of FIG. 1 or the electronic device 300 of FIG. 3) may add an identified target model file to the model file list.

According to certain embodiments, the model file list may be generated in advance to manage model files for AI functions of one or more applications installed in the electronic device. For example, the model file list may be managed by the application manager 201 described above with reference to FIG. 2.

According to certain embodiments, operation 420 of FIG. 4 may include operation 520.

In operation 520, the processor may determine a target initialization time of the target model file by determining an initialization time of each of model files included in the model file list. For example, an initialization time of a first model file may be determined as a first time (e.g., a booting time), and an initialization time of a second model file may be determined as a second time (e.g., an idle time), so that initialization times of the model files in the model file list may be determined to be distributed.

According to an example embodiment, the processor 310 may add a target model file to a model file list and may determine an initialization time of each of one or more model files included in the model file list, to determine a target initialization time of the target model file.

According to an example embodiment, the method of initializing the model file may further include operation 510 of adding the identified target model file to the model file list, and operation 420 of determining the target initialization time may include operation 520 of determining the target initialization time of the target model file by determining initialization times for each of the model files in the model file list.

According to an example embodiment, the electronic device 300 may include a memory (e.g., the memory 330) configured to store one or more applications, and at least one processor 310 configured to control the electronic device 300. The processor 310 may generate a model file list including one or more model files of the processor 310, may determine an initialization time of each of the one or more model files based on usage patterns of the one or more applications, and may initialize a model file corresponding to a first initialization time at the first initialization time.

Figure 6:
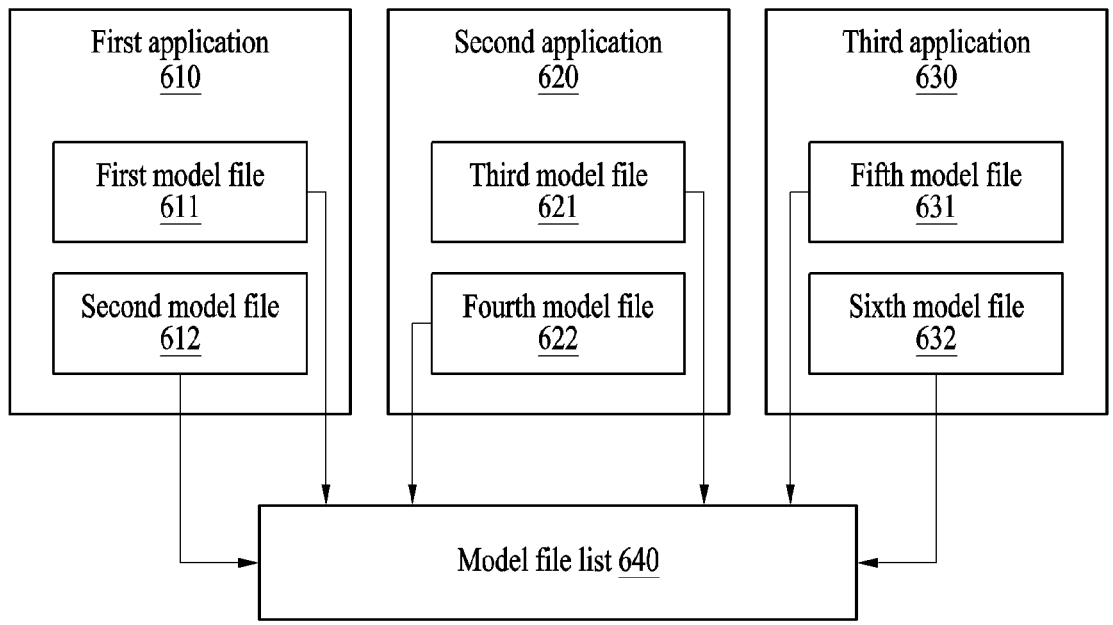
FIG. 6 illustrates a model file list according to various example embodiments.

FIG. 6 illustrates a model file list according to various example embodiments.

According to an example embodiment, a first application 610, a second application 620, and a third application 630 may be installed in an electronic device (e.g., the electronic device 101 of FIG. 1 or the electronic device 300 of FIG. 3). For example, the first application 610 may be associated with a first model file 611 and a second model file 612, and the second application 620 may be associated with a third model file 621 and a fourth model file 622. The third application 630 may be associated with a fifth model file 631 and a sixth model file 632.

For example, when the third application 630 is newly installed in the electronic device, a processor (e.g., the processor 120 of FIG. 1 or the processor 310 of FIG. 3) of the electronic device may identify the fifth model file 631 and the sixth model file 632 associated with the third application 630, and may add the identified fifth model file 631 and the identified sixth model file 632 to a model file list 640.

Figure 7:
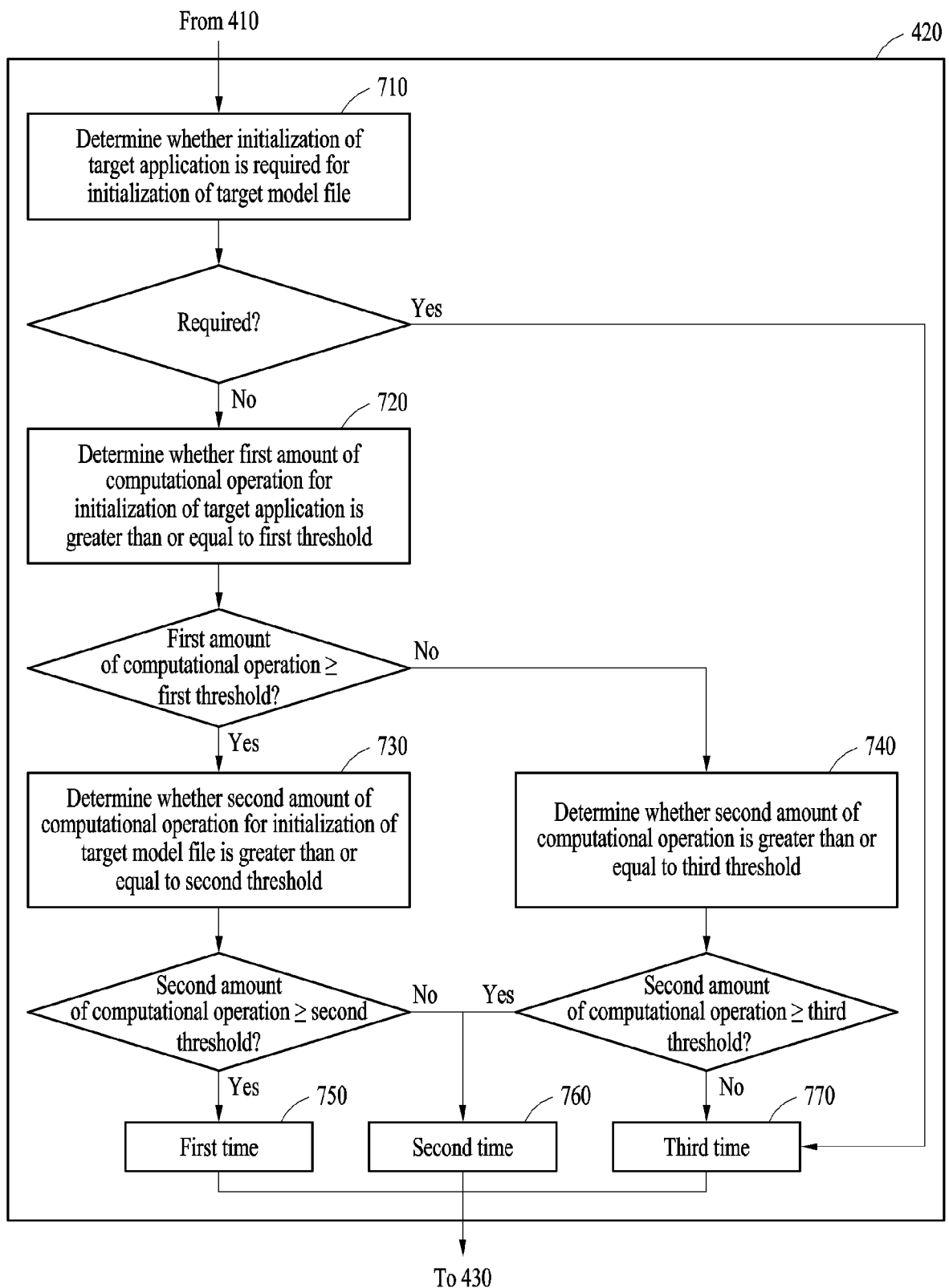
FIG. 7 illustrates a flowchart of a method of determining a target initialization time of a target model file among a plurality of initialization times according to various example embodiments.

FIG. 7 is a flowchart of a method of determining a target initialization time of a target model file among a plurality of initialization times according to various example embodiments.

According to an example embodiment, operation 420 described above with reference to FIG. 4 may include the following operations 710 to 770. Operations 710 to 770 may be performed by an electronic device (e.g., the electronic device 101 of FIG. 1 or the electronic device 300 of FIG. 3).

In operation 710, a processor (e.g., the processor 120 of FIG. 1 or the processor 310 of FIG. 3) of the electronic device may determine whether initialization of a target application is required for initialization of the target model file. For example, initialization of an application may include a process of loading or initializing resources of the electronic device for the application. The initialization of the application may be, for example, a process of scheduling use of resources.

According to certain embodiments, in an example in which the initialization of the target application is required for the initialization of the target model file, input information of an application may be required in a process of loading or compiling a model file.

According to certain embodiments, when it is difficult to separate an operation for initialization of a target model file and an operation for initialization of a target application, the operation for the initialization of the target model file may be separated into a specific thread (e.g., a target thread), and a target initialization time may be determined so that the initialization of the target model file may be performed through the specific thread at a time (e.g., a third time) at which the initialization of the target application is performed.

According to certain embodiments, when the processor includes a plurality of cores, a plurality of threads may be processed in parallel by each of the cores. The processor may process, in parallel, a thread for the initialization of the target application and a target thread for the initialization of the target model file. When the initialization of the target model file needs to be completed in advance to complete the initialization of the target application, a waiting time may be given to the thread for the initialization of the target application.

When the initialization of the target application is required for the initialization of the target model file, operation 770 may be performed.

In operation 770, the processor may determine a target initialization time as a time (e.g., a third time) at which the initialization of the target application is performed.

According to certain embodiments, when the initialization of the target application is not required for the initialization of the target model file, operation 720 may be performed. Although operation 720 is performed according to a result of operation 710 as described above, operation 720 may be performed even when operation 710 is not performed depending on example embodiments. In other words, operation 710 may not be included in operation 420 depending on example embodiments.

In operation 720, the processor may determine whether a first amount of computational operation for the initialization of the target application is greater than or equal to a first threshold. For example, the first amount of computational operation may be an amount by which a processing load of hardware (e.g., a processor, a memory, or a bus) increases due to the initialization of the target application.

When the first amount of computational operation is greater than or equal to the first threshold, operation 730 may be performed, and when the first amount of computational operation is less than the first threshold, operation 740 may be performed.

In operation 730, the processor may determine whether a second amount of computational operation for the initialization of the target model file is greater than or equal to a second threshold. For example, the second amount of computational operation may be an amount by which a processing load of hardware (e.g., a processor, a memory, or a bus) increases due to the initialization of the target model file.

When the second amount of computational operation is greater than or equal to the second threshold, operation 750 may be performed, and when the second amount of computational operation is less than the second threshold, operation 760 may be performed.

In an example, when the second amount of computational operation is greater than or equal to the second threshold, the processor may determine an initialization time of the target model file as a booting time (e.g., a first time) of the electronic device in operation 750. For example, when a processing load of hardware is caused by both the initialization of the target application and the initialization of the target model file, the initialization time of the target model file may be determined as a booting time of the electronic device so that the initialization time of the target application and the initialization time of the target model file may be separated.

In another example, when the second amount of computational operation is less than the second threshold, the processor may determine the initialization time of the target model file as an idle time (e.g., a second time) of the electronic device in operation 760. The idle time of the electronic device may be defined as, for example, a point in time at which a utilization of the processor is less than a preset value. For example, when a processing load of hardware is caused by the initialization of the target application, not caused by the initialization of the target model file, the initialization time of the target model file may be determined as an idle time of the electronic device, to separate the initialization time of the target application and the initialization time of the target model file.

In another example embodiment, when the processing load of hardware is caused by the initialization of the target application, not caused by the initialization of the target model file, the initialization time of the target model file may be determined as the initialization time (e.g., the third time) of the target application.

In operation 740, the processor may determine whether the second amount of computational operation for the initialization of the target model file is greater than or equal to a third threshold.

When the second amount of computational operation is greater than or equal to the third threshold, operation 760 may be performed, and when the second amount of computational operation is less than the third threshold, operation 770 may be performed.

In an example, when the second amount of computational operation is greater than or equal to the third threshold, the processor may determine the initialization time of the target model file as an idle time (e.g., the second time) of the electronic device in operation 760. For example, when a processing load of hardware is caused by the initialization of the target model file, not caused by the initialization of the target application, the initialization time of the target model file may be determined as an idle time of the electronic device, to separate the initialization time of the target application and the initialization time of the target model file.

In another example, when a processing load of hardware is caused by the initialization of the target model file, not caused by the initialization of the target application, the initialization time of the target model file may be determined as the initialization time (e.g., the third time) of the target application.

According to an example embodiment, the processor 310 may determine the target initialization time based on at least one of an amount of computational operation for the initialization of the target application and an amount of computational operation for the initialization of the target model file.

According to an example embodiment, the processor 310 may determine the target initialization time based on whether the initialization of the target application is required for the initialization of the target model file.

According to an example embodiment, operation 420 of determining the target initialization time may include determining the target initialization time based on whether initialization of the target application is required for initialization of the target model file.

Figure 8:
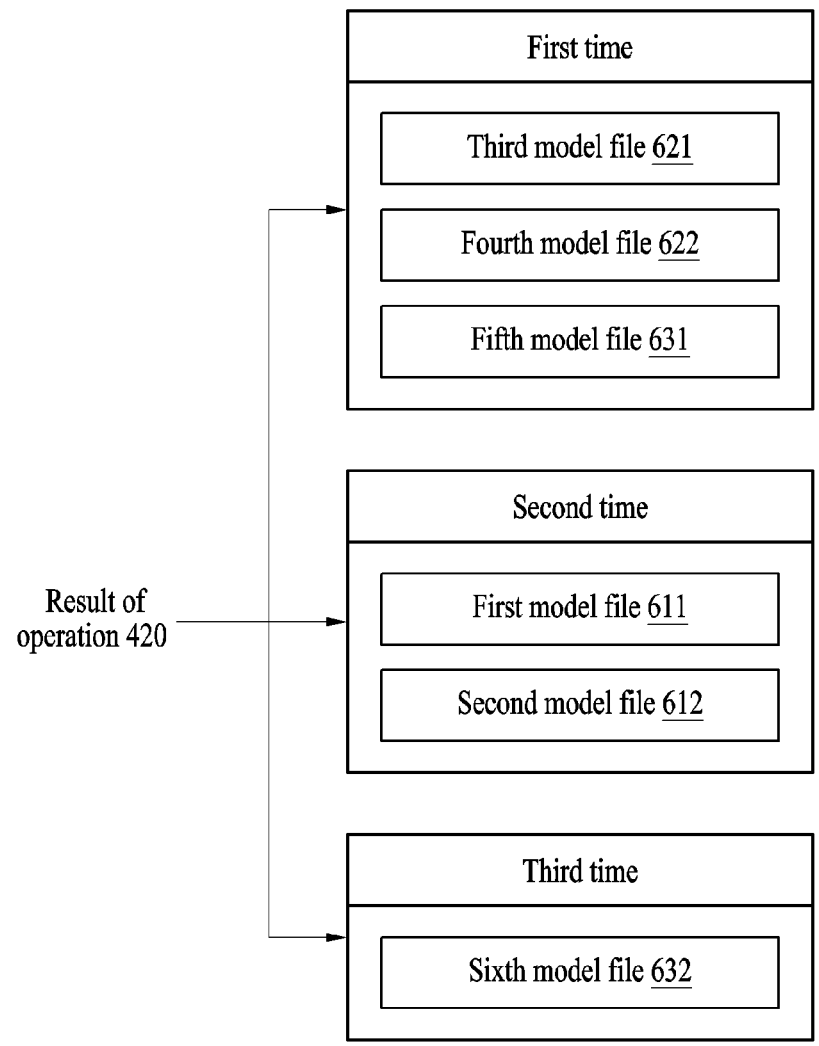
FIG. 8 illustrates initialization times determined for model files of a model file list according to various example embodiments.

FIG. 8 illustrates initialization times determined for model files of a model file list according to various example embodiments.

According to certain embodiments, an initialization time of each of a third model file 621, a fourth model file 622, and a fifth model file 631 may be determined as a first time, and an initialization time of each of a first model file 611 and a second model file 612 may be determined as a second time. An initialization time of a sixth model file 632 may be determined as a third time. For example, when an operation time of an electronic device (e.g., the electronic device 101 of FIG. 1 or the electronic device 300 of FIG. 3) is the first time, the third model file 621, the fourth model file 622 and the fifth model file 631 may be sequentially initialized.

Initialization times determined for the model files of the model file list may be dynamically managed.

According to certain embodiments, a processor (e.g., the processor 120 of FIG. 1 or the processor 310 of FIG. 3) of the electronic device may generate a usage pattern in which a user uses one or more applications installed in the electronic device, through an application manager (e.g., the application manager 201 of FIG. 2). For example, the application manager may generate a usage pattern based on an execution log of an application. For example, the usage pattern may include a frequency and a duration of use of each of the one or more applications, and a frequency and a duration of use of each of one or more model files of an application.

According to certain embodiments, every time an application is installed or executed, the application manager may generate usage patterns of applications by checking information on a file model used by an application, information on an inference engine of the file model, information on initialization of the file model, and information (e.g., an initialization time, an amount of computational operation for initialization, or a thread usage) on initialization of an application. For example, usage patterns of applications may be generated based on a time, an occasion, and a place of the electronic device obtained from a sensor module (e.g., the sensor module 176 of FIG. 1) of the electronic device.

According to certain embodiments, the processor may re-determine (or change) the target initialization time of the target model file among a plurality of preset initialization times by inputting usage patterns of applications to an initialization time determination model. For example, the initialization time determination model may be a neural network-based model, but is not limited thereto.

According to certain embodiments, the initialization time determination model may continue to be updated (or trained) based on usage patterns of applications and feedback of a user.

According to certain embodiments, the processor may rearrange an initialization order of model files based on the usage patterns of the applications. A method of rearranging an initialization order of model files will be described in detail below with reference to FIG. 9.

According to certain embodiments, the processor may change initialization times of the model files based on the usage patterns of the applications. A method of changing initialization times of model files will be described in detail with reference to FIG. 10.

Figure 9:
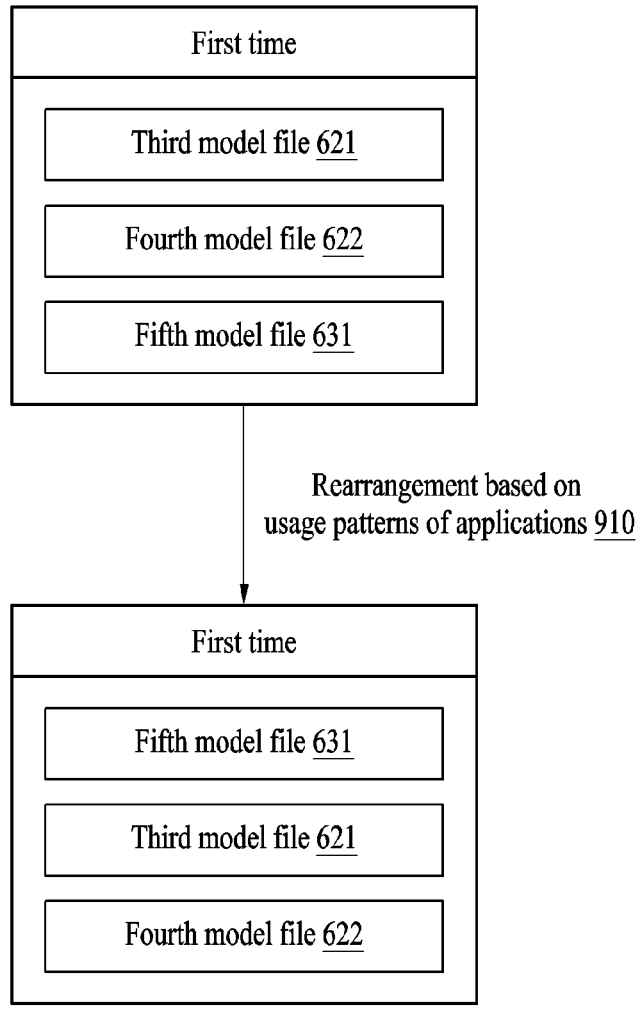
FIG. 9 illustrates a method of rearranging an initialization order of model files based on usage patterns of applications according to various example embodiments.

FIG. 9 illustrates a method of rearranging an initialization order of model files based on usage patterns of applications according to various example embodiments.

According to an example embodiment, operation 910 may be performed after operation 420 of FIG. 4 is performed. For example, operation 910 may be performed in parallel to and independently of operation 430 of FIG. 4.

In operation 910, a processor (e.g., the processor 120 of FIG. 1 or the processor 310 of FIG. 3) of an electronic device (e.g., the electronic device 101 of FIG. 1 or the electronic device 300 of FIG. 3) may rearrange the initialization order of the model files based on the usage patterns of the applications.

According to certain embodiments, although the third model file 621, the fourth model file 622, and the fifth model file 631 are determined to be sequentially initialized at the first time based on the usage patterns of the applications as described above with reference to FIG. 8, an initialization order of the third model file 621, the fourth model file 622, and the fifth model file 631 may be rearranged when the usage patterns of the applications are updated. For example, when a frequency of use of the fifth model file 631 increases in comparison to a frequency of use of each of the third model file 621 and the fourth model file 622, the initialization order may be rearranged such that the fifth model file 631 may be initialized earlier than the other model files, for example, the third model file 621 and the fourth model file 622.

According to an example embodiment, the processor 310 may determine the target initialization time of the target model file based on usage patterns of one or more applications.

According to an example embodiment, the usage patterns may include a frequency of use of each of the one or more applications and a frequency of use of each of one or more model files of an application.

According to an example embodiment, operation 420 of determining the target initialization time may include determining the target initialization time based on usage patterns of the one or more applications.

Figure 10:
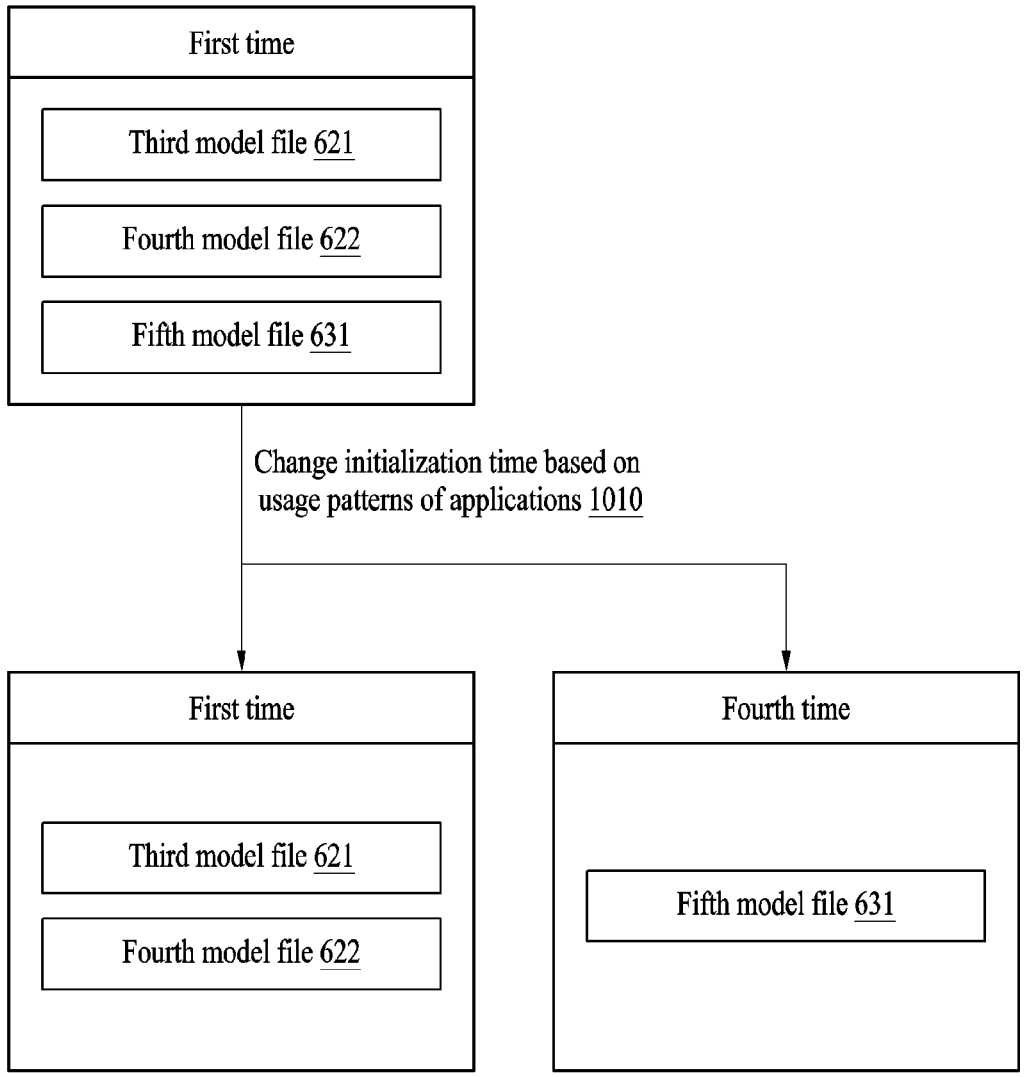
FIG. 10 illustrates a method of changing initialization times of model files based on usage patterns of applications according to various example embodiments.

FIG. 10 illustrates a method of changing initialization times of model files based on usage patterns of applications according to various example embodiments.

According to an example embodiment, operation 1010 may be performed after operation 420 of FIG. 4 is performed. For example, operation 1010 may be performed in parallel to and independently of operation 430 of FIG. 4.

In operation 1010, a processor (e.g., the processor 120 of FIG. 1 or the processor 310 of FIG. 3) of an electronic device (e.g., the electronic device 101 of FIG. 1 or the electronic device 300 of FIG. 3) may change initialization times of the model files based on usage patterns of applications.

According to certain embodiments, although the third model file 621, the fourth model file 622, and the fifth model file 631 may be determined to be initialized at the first time based on the usage patterns of the applications as described above with reference to FIG. 8, an initialization time of at least one model file, for example, the third model file 621, the fourth model file 622, and the fifth model file 631, may be changed when the usage patterns of the applications are updated. For example, when a frequency of use of the fifth model file 631 decreases, the initialization time of the fifth model file 631 may be changed from the first time to a fourth time. The fourth time may be, for example, a point in time at which a preset delay time elapses since the third application 630 is executed. By changing the initialization time of the fifth model file 631 not frequently used by a user to a time after a time in which the third application 630 is executed, a frequency of initialization of the fifth model file 631 may be reduced. Referring back to FIG. 5, the fifth model file 631 may not be initialized if the third application 630 is not executed, for example, when the fourth time does not arrive.

Figure 11:
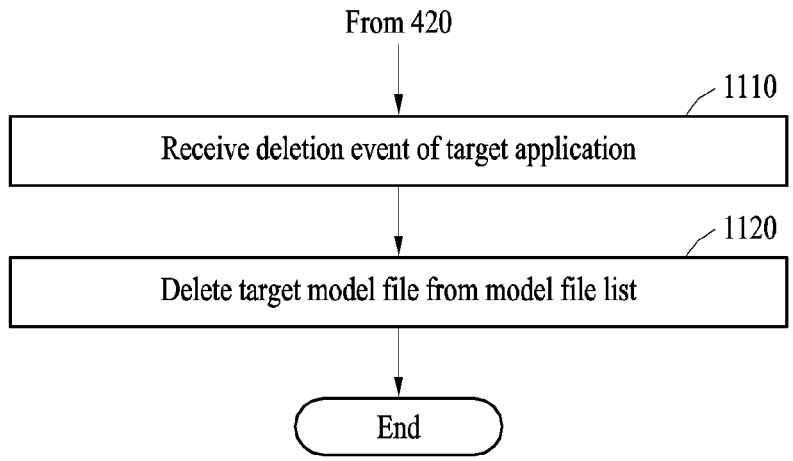
FIG. 11 is a flowchart of a method of deleting a model file from a model file list according to various example embodiments.

FIG. 11 is a flowchart of a method of deleting a model file from a model file list according to various example embodiments.

According to an example embodiment, operations 1110 and 1120 may be performed after operation 420 of FIG. 4 is performed. For example, operations 1110 and 1120 may be performed in parallel to and independently of operation 430 of FIG. 4.

In operation 1110, a processor (e.g., the processor 120 of FIG. 1 or the processor 310 of FIG. 3) of an electronic device (e.g., the electronic device 101 of FIG. 1 or the electronic device 300 of FIG. 3) may receive a deletion event of a target application. For example, when the third application 630 described above with reference to FIG. 6 is deleted from the electronic device, an application manager (e.g., the application manager 201 of FIG. 2) may generate a third application deletion event.

In operation 1120, the processor may delete a target model file from the model file list. The target model file deleted from the model file list may no longer be managed.

Figure 12:
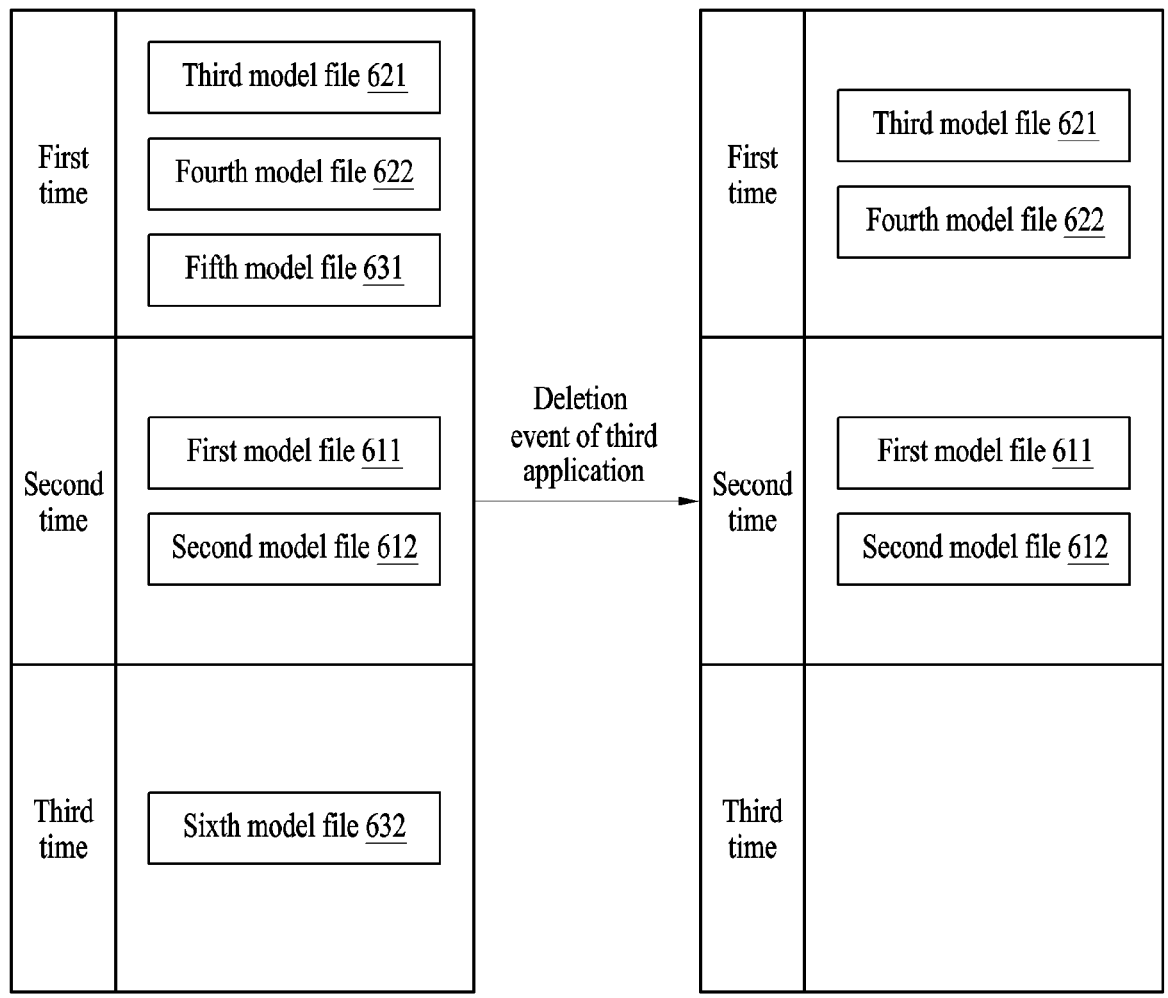
FIG. 12 illustrates a model file list from which a model file is deleted according to various example embodiments.

FIG. 12 illustrates a model file list from which a model file is deleted according to various example embodiments.

According to certain embodiments, when a third application deletion event is generated by deleting the third application 620 from an electronic device (e.g., the electronic device 101 of FIG. 1 or the electronic device 300 of FIG. 3) in the example embodiments described above with reference to FIGS. 6 and 8, the fifth model file 631 and the sixth model file 632 of the third application 620 may be deleted from the model file list. When the fifth model file 631 and the sixth model file 632 are deleted from the model file list, initialization times of the fifth model file 631 and the sixth model file 632 may no longer be managed.

Figure 13:
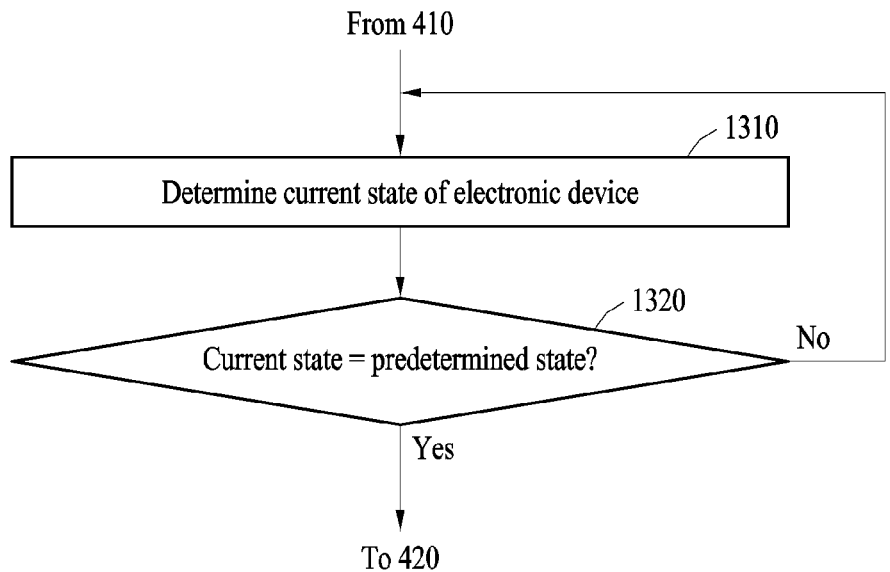
FIG. 13 is a flowchart of a method of determining a target initialization time of a target model file based on a current state of an electronic device according to various example embodiments.

FIG. 13 is a flowchart of a method of determining a target initialization time of a target model file based on a current state of an electronic device according to various example embodiments.

According to an example embodiment, operations 1310 and 1320 may be performed after operation 410 of FIG. 4 is performed.

In operation 1310, a processor (e.g., the processor 120 of FIG. 1 or the processor 310 of FIG. 3) of an electronic device (e.g., the electronic device 101 of FIG. 1 or the electronic device 300 of FIG. 3) may determine a current state of the electronic device. For example, the processor may determine a current state of the processor based on at least one of an amount of power remaining in a battery (e.g., the battery 189 of FIG. 1) of the electronic device, a current time, and a utilization of the processor.

In operation 1320, the processor may determine whether the determined current state is a predetermined state. The predetermined state may be, for example, a state in which a user does not feel inconvenience such as a reduction in an execution speed of an application when using the electronic device even though a hardware component of the electronic device is used to determine the target initialization time of the target model file. For example, the predetermined state may be one of an inactive state and an idle state, however, example embodiments are not limited thereto.

When the determined current state is the predetermined state, operation 420 of FIG. 4 may be performed.

Operation 420 may be performed only when the electronic device is determined to be in an inactive state or an idle state, even though a large amount of resources of the electronic device is required to perform operation 420. Thus, a user may not feel uncomfortable in using the electronic device.

According to an example embodiment, the processor 310 may determine whether a current state of the electronic device 300 corresponds to a predetermined state, and when the current state corresponds to the predetermined state, may determine the target initialization time of the target model file.

According to an example embodiment, the method of initializing the model file may further include operation 1320 of determining whether the current state of the electronic device 300 corresponds to a predetermined state, and operation 420 of determining the target initialization time in FIG. 4 may include determining the target initialization time of the target model file when the determined current state of the electronic device 300 corresponds to the predetermined state.

The example embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described example embodiments, or vice versa.

As described above, although the example embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other example embodiments, and equivalents to the claims are also within the scope of the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a processor; and
   memory,
   wherein the memory stores instructions that, when executed by the processor, cause the electronic device to:
   identify a target model file based on a neural network and associated with a target application among the one or more applications;
   determine a target initialization time of the target model file as a time selected from a plurality of preset initialization times based on usage patterns of the one or more applications, wherein the usage patterns comprise:
   a frequency of use of each of the one or more applications, and
   a frequency of use of each of one or more model files of the target application; and
   initialize the target model file at the target initialization time.

2. The electronic device of claim 1, wherein when executed by the processor, the instructions cause the electronic device to further:
   add the target model file to a model file list; and
   determine the target initialization time by determining an initialization time of each of one or more model files included in the model file list.

3. The electronic device of claim 1, wherein when executed by the processor, the instructions cause the electronic device to determine the target initialization time based on at least one of:
an amount of computational operation for initialization of the target application, and
an amount of computational operation for initialization of the target model file.

4. The electronic device of claim 1, wherein when executed by the processor, the instructions cause the electronic device to determine the target initialization time based on whether initialization of the target application is required for initialization of the target model file.

5. The electronic device of claim 1, wherein when executed by the processor, the instructions cause the electronic device to further:
determine whether a current state of the electronic device corresponds to a predetermined state, and
determine the target initialization time when the current state corresponds to the predetermined state.

6. The electronic device of claim 1, wherein, to initialize the target model file, when executed by the processor, the instructions cause the electronic device to further:
initialize a runtime engine assigned to the target model file,
initialize a compiler assigned to the target model file, and
initialize a hardware component module assigned to the target model file.

7. The electronic device of claim 1, wherein, when an inference engine of the target model file is operated by a server, a network connection between the electronic device and the server is established by initializing the target model file.

8. The electronic device of claim 1, wherein, when the target model file is initialized, output data corresponding to input data is generated by the neural network of the target model file.

9. The electronic device of claim 1, wherein the electronic device is a mobile communication terminal.

10. A method of initializing a model file of an application, the method performed by an electronic device and comprising:
identifying a target model file based on a neural network and associated with a target application among one or more applications installed in the electronic device;
determining a target initialization time of the target model file as a time selected from a plurality of preset initialization times based on usage patterns of the one or more applications, wherein the usage patterns comprise:
a frequency of use of each of the one or more applications, and
a frequency of use of each of one or more model files of the target application; and
initializing the target model file at the target initialization time.

11. The method of claim 10, further comprising:
adding the identified target model file to a model file list, and
wherein the determining of the target initialization time comprises determining an initialization time of each of one or more model files included in the model file list.

12. The method of claim 10, wherein the determining of the target initialization time is based on usage patterns of the one or more applications.

13. The method of claim 10, further comprising:
determining whether a current state of the electronic device corresponds to a predetermined state,
wherein the determining of the target initialization time comprises determining the target initialization time when the current state is determined to correspond to the predetermined state.

14. The method of claim 10, wherein when an inference engine of the target model file is operated by a server, a network connection between the electronic device and the server is established by initializing the target model file.

15. The method of claim 10, wherein, to initialize the target model file, the determining of the target initialization time further comprises:
initializing a runtime engine assigned to the target model file;
initializing a compiler assigned to the target model file; and
initializing a hardware component module assigned to the target model file.

16. A non-transitory computer-readable storage medium storing instructions that, when executed by a processor, cause the processor to perform the method of claim 12.

* * * * *